Jan. 15, 1924.
L. P. KELLY ET AL
1,480,766
FLY
Filed March 17, 1923
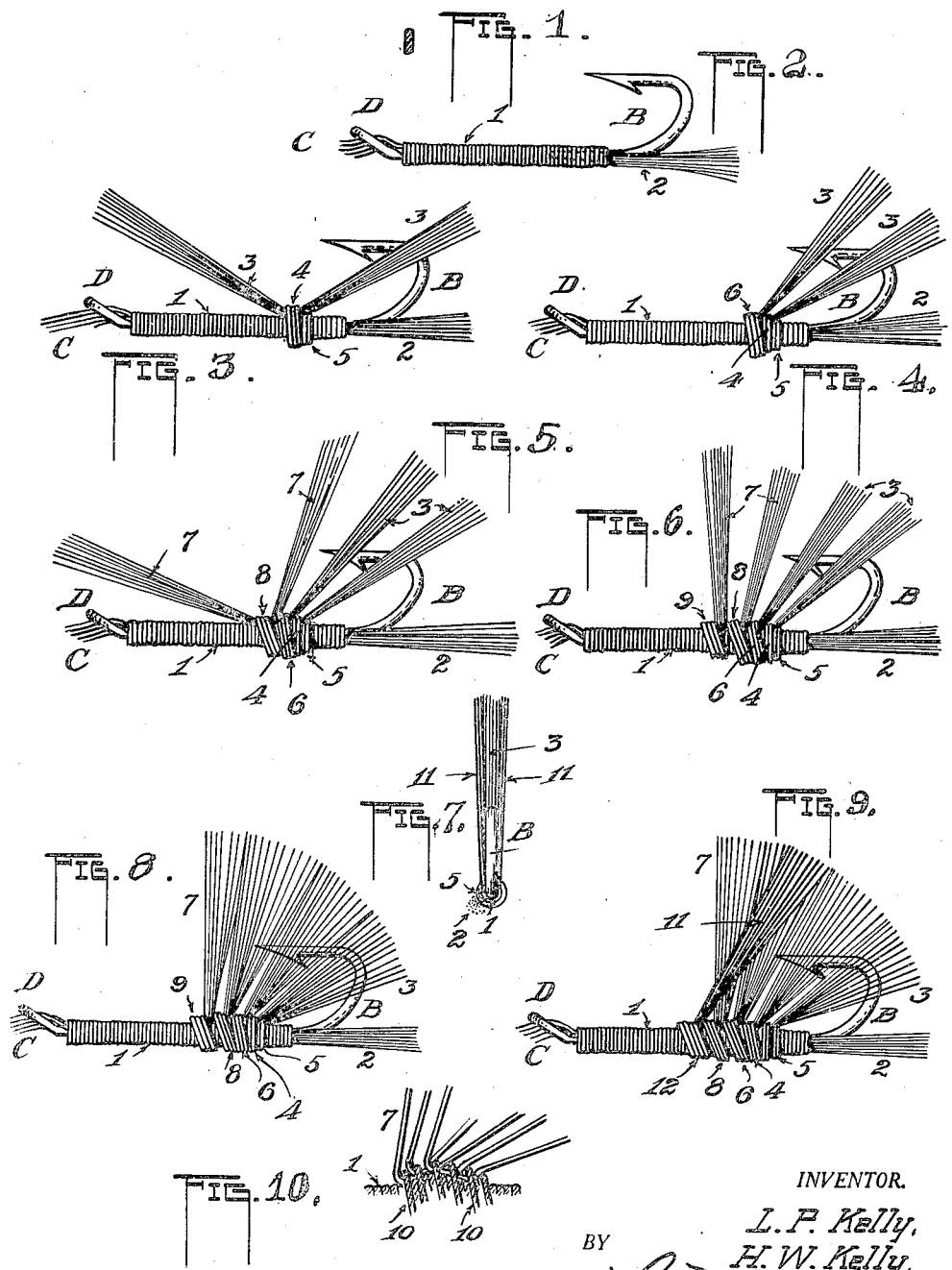
INVENTOR.
L. P. Kelly,
H. W. Kelly,
BY
ATTORNEY.

Patented Jan. 15, 1924.

1,480,766

UNITED STATES PATENT OFFICE.

LEWIS P. KELLY AND HARRY W. KELLY, OF PEORIA COUNTY, ILLINOIS.

FLY.

Application filed March 17, 1923. Serial No. 625,706.

*To all whom it may concern:*

Be it known that we, LEWIS P. KELLY and HARRY W. KELLY, both citizens of the United States, residing in the county of Peoria and State of Illinois, have invented new and useful Improvements in Flies; and we do hereby declare that the following is a full, clear, and exact description of the invention, which will enable others skilled in the art to which it appertains to make and use the same.

This invention pertains to improvements in artificial bait, being designated usually by the term "fly."

The objects of our invention are first, to provide a fly of bright, attractive coloring as a lure which will be so constructed that it will not catch in weeds or upon stumps or snags; second, to provide a fly whose hook is protected by a material which while yieldable when struck by a fish in an attack will have a rigidity sufficient to prevent the hook in its passage through the water from catching upon objects; third, to provide a fly wherein the lure in order to best represent a bait is of a flat form and made to lie in the same plane with the hook and its barb covering the latter; fourth, to form the shank of the hook and so attach the bait or lure that neither can move with respect to the other; fifth, to so construct a fly that it will be of the least possible weight so as to fall lightly upon the water; and sixth, to combine with a hook a stay or snell of peculiar form that will not break at the place of attachment to said hook.

Other advantages will be described herein as the construction is made known, assisted by the appended drawing wherein:

Figure 1 is a cross section of the shank of the hook of our improved fly much enlarged.

Figure 2 is a side elevation of the hook showing the manner of binding the snell in place upon its shank together with part of the lure.

Figure 3 is a side elevation of the lure as shown in Figure 2 with a second part of the lure in place prior to its final disposal.

Figure 4 is a view similar to Figure 3 showing another position of the lure referred to therein.

Figure 5 is another view similar to Figures 3 and 4 showing the placing of another portion of the lure.

Figure 6 shows the position of the added lure referred to, regarding Figure 5.

Figure 7 is an end elevation of the hook.

Figure 8 is a side elevation of the fly showing the spread position of the parts of the lure.

Figure 9 is a side elevation of the completed fly which includes a further lure-portion shown only in Figure 7, and Figure 10 is a detail of parts, much enlarged, showing a manner of separating individual strands of the lure and for holding them in positions to create the fan-like appearance shown in Figures 8 and 9.

In constructing the fly we preferably first change the form of the shank A of the hook B as by flattening it, for example as shown in cross section in Figure 1, or in some other way whereby to destroy its usual round form, for preventing the lure when attached from turning thereon.

In our improved fly we preferably employ a good coarse hair for the lure and have found that hair from the tail of a horse answers our purpose admirably in that it retains its straight form and the position in which its several strands may be disposed regardless of whether it is wet or dry, and the rigidity thereof is always sufficient to guard the hook and prevent it catching in weeds or upon stumps or the like either in or out of the water.

In Figure 2 a tuft of hair 2 is laid upon the shank of the hook B at the side thereof and parallel thereto, a portion thereof being secured by the silk wrapping 1 while the free ends of the tuft extend somewhat beyond the end of the hook as shown. Figure 3 is a duplicate of Figure 2 but in this figure a second tuft of hair 3 is placed upon the shank at that side adjacent the barb of the hook, being bound at its middle to said shank A, or rather upon the winding 1 by a second winding 4. We employ a peculiar manner of binding this tuft of hair and positioning its separate extremities as is true of a third tuft to be described presently. That is to say, we place a winding 5 over the winding 1 so as to build up a slight hump against which the tuft 3 lies, the said winding 4 being then bound upon the tuft directly behind said winding 5 with the result that the hair is made to take up and maintain an angling position with respect to the shank and to extend toward and beyond the bend of the hook and its barb. The other end of the tuft is then bent over upon the winding 4 and a further winding 6 binds the same in place, projecting at a slightly different angle from the extremity previously placed as clearly shown in Figures 4, 5 and 6. Next, the mentioned third tuft 7 is placed adjacent the tuft 3, one portion thereof lying against the winding 6 for example, so as to direct said portion toward the point of the barb of the hook followed by a winding 8 to hold it in place. A further winding 9 now is positioned to hold the other portion upright as viewed in Figure 6.

We now have four extensions of the tufts of hair radiating from the shank in the direction of the bent end of the hook and its barb, as the figure last named illustrates, but in order to be most attractive as a lure and also that the point of the hook may be properly protected we separate the hairs of each extension by single wrappings of fiber or thread 10 after the manner shown in Figure 10, for example, which has been purposely greatly enlarged, and illustrated more or less loosely, in order to best illustrate the method. By a proper disposal of the several convolutions of the thread it may be seen that the hairs may be separated and disposed in such positions relatively that a fan-like form of the hair is the result so that the barb of the hook and the entire bend of the hook, in fact is entirely covered and more or less concealed. However, we have found that while making use of the various windings previously referred to, the convolutions thereof as placed may be so disposed as to gradually make the desired operation of separation of the hairs a reality without a special winding, as 10, being necessary.

As a final addition to the fly, although we may not use it, a tuft of hair 11 is placed back of the tuft 7 and secured in place by proper windings. That is to say, the hair tufts already secured in place may be of any general bright or vivid color that will be attractive as a lure while the final tuft 11 is of an entirely different bright color, the extremities of the same lying at opposite sides of those mentioned. Said tuft 11 is bent around the shank A and the windings thereon, its extremities being positioned as shown in Figure 7 flanking the other tufts. The windings 12, Figure 9, serving to direct the hairs in an oblique direction and to separate and spread them to the desired extent.

The extensions of this final tuft are termed "wings" and add to the general attractiveness of the fly.

As the various windings of the thread are applied they may be treated with a coating of suitable waterproof material and after the final windings are in place a final coat may be applied. However, the method of protection and the type of protecting material used is a matter of choice entirely. The extremities of the spread hairs may now be trimmed into proper shape and the fly is complete.

Our fly since composed of hair is of light weight and will alight upon the water with the least disturbance and of importance is the fact that the hair is not affected by water and consequently will not become matted and therefore guards the hook against being snagged. The hair lies flat and in the same plane with the hook and thereby guards it most effectively and no excess material is needed outside said plane weighting down the fly.

While the hair may be placed differently from the method shown with respect to the bundles or tufts 3 and 7, or a single tuft made to answer the purpose of the two, it is preferred to place the tufts separately since thereby bunching in one place and creating an undesirable appearance is avoided. Furthermore, the hair is more easily secured in position and can be more firmly held in place when divided into portions as described and shown.

The tuft 7 making up the "wings" mentioned previously when used is preferably disposed between the barb or point of the hook and the eye D, lying nearest the former. Said wings are slightly flared as shown in Figure 7 so that they aid in preventing the barb catching upon objects, and since lying near the point of the hook or barb also assist in this aim since the hair is more bulky at that position.

An advantage of the thinned out fan-like form of the guard made up of the several tufts of hair is that in the passage of the fly through the air, as in casting for example, the water by air pressure is blown from the hair so that the lightness of the fly is maintained.

We claim:

1. A fish-hook having a guard attached to its shank arranged in fan-like form paralleling the plane of the hook, covering the barb thereof.

2. A fish-hook having a guard attached to its shank comprising bunches of individual strands separated from one another in fan-like form said strands being of a type unaffected by moisture, the same lying in the same plane with the hook and its barb and covering the same.

3. A fish-hook having a guard for its barb comprising strands of a material unaffected by water and adapted to maintain the positions in which they are placed, the same being separated from one another in a flat fan-like form paralleling the plane of the hook and covering the same and its barb.

4. A fish-hook having a guard attached to its shank composed of strands of hair arranged in a substantially fan-like form paralleling the hook and its barb and covering the same.

5. A fish-hook having a guard for its barb comprising strands of hair attached in bundles or tufts to its shank and having said strands separated in fan-like form and lying in the plane of the hook covering the barb thereof, and windings of fiber for securing the tufts to said shank.

6. A fish-hook having a shank irregular in cross sectional form, a bundle or tuft of hair disposed upon that side of the shank lying nearest the barb of said hook, the strands thereof being separated in fan-like form and extending from said shank beyond the barbed end of the hook and lying parallel to and upon said hook and its barb covering the same, and means to secure the bundles or tufts in position and for maintaining the separation of said strands in said fan-like form.

7. A fish-hook having a shank irregular in cross sectional form, a stay or snell extending through the eye of the hook and lying upon the shank of the hook, a material wound about the shank and said snell binding the latter thereto, a bundle or tuft of hair disposed upon the shank whose extremities extend beyond the hook and its barb, and a winding securing the hair in place and separating and securing its strands in fan-like form in the plane of the said hook and its barb, covering the same.

8. A fish-hook having a bundle or tuft of hair attached to its shank, means for securing the same thereto and for separating the strands thereof into fan-like form, the same lying parallel to the hook and its barb covering the same, and a bundle or tuft of hair also secured about the shank and having its extremities lying at opposite sides of the said fan-like formation and spread also in fan-like form, the latter being of a different color than the hair first described, and means for securing the same upon the shank and holding the strands in their spread positions.

9. In combination with a fish-hook, a guard attached to the shank thereof comprising tufts of material having separate strands adapted to be spread in open formation in the plane of the hook and its barb, means secured to the shank forming an extension projecting laterally therefrom against which the tuft is placed, said extension forming a lodgment for the tuft and for directing its strands in a given direction, and a wrapping adjacent the extension encircling and overlying the tuft holding the latter in position against said extension.

10. In combination with a fish hook, a guard for the bent portion and the barb thereof comprising tufts of separate strands of material arranged to lie in the plane of the same, means to secure the tufts to the shank of the hook, means on the shank to direct the strands in a desired general direction, and separate windings whose convolutions lie between and separate the strands of the tufts in fan-like form in the said plane of the barb.

In testimony whereof we affix our signatures in presence of two witnesses.

LEWIS P. KELLY.
HARRY W. KELLY.

Witnesses:
J. H. KINGSBURY,
L. M. THURLOW.